Dec. 31, 1935.  J. J. INGELS  2,025,750
METHOD OF AND APPARATUS FOR MAKING SEAMED PIPE
Original Filed Jan. 10, 1931  4 Sheets-Sheet 1
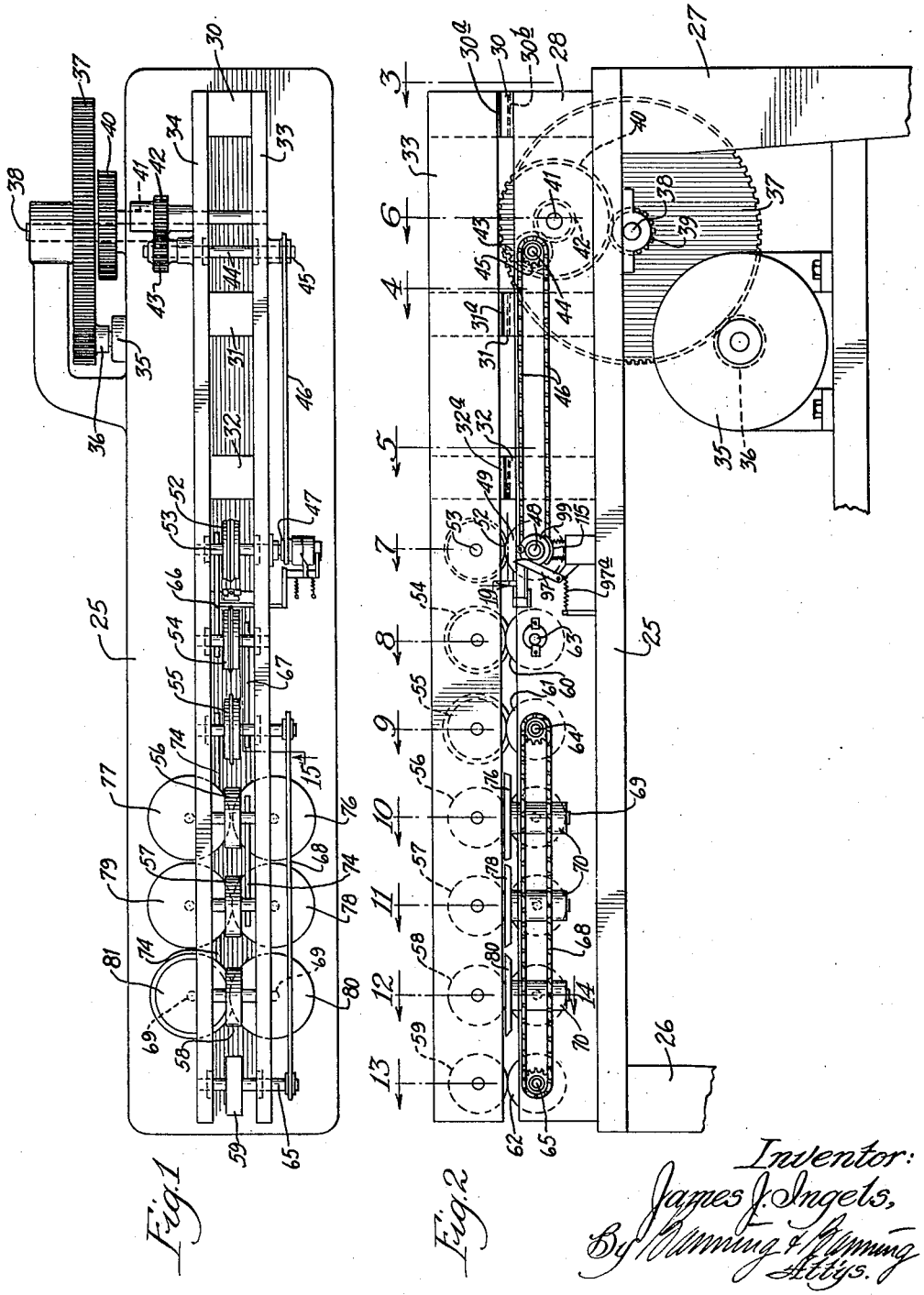

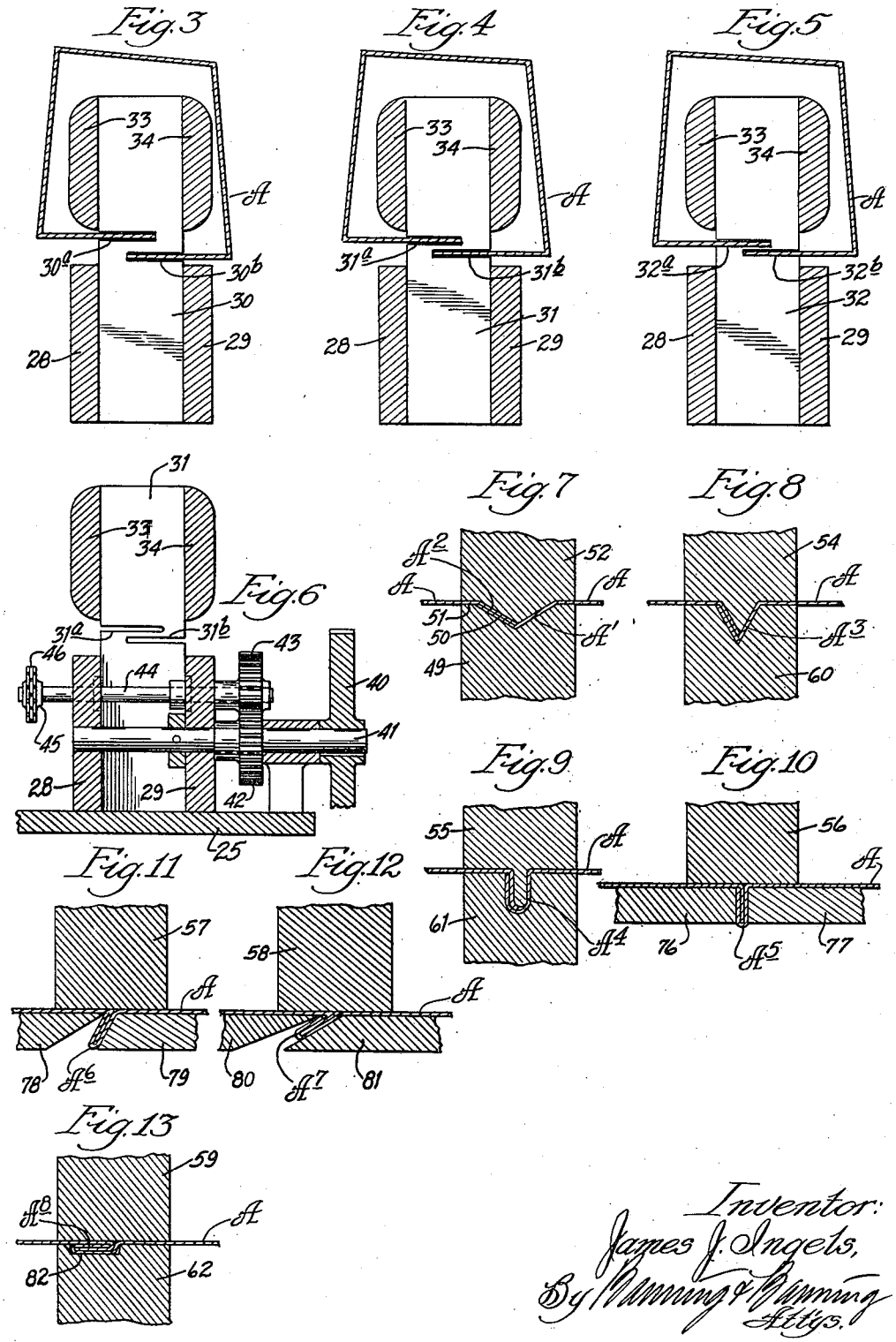

Dec. 31, 1935.  J. J. INGELS  2,025,750
METHOD OF AND APPARATUS FOR MAKING SEAMED PIPE
Original Filed Jan. 10, 1931  4 Sheets-Sheet 3
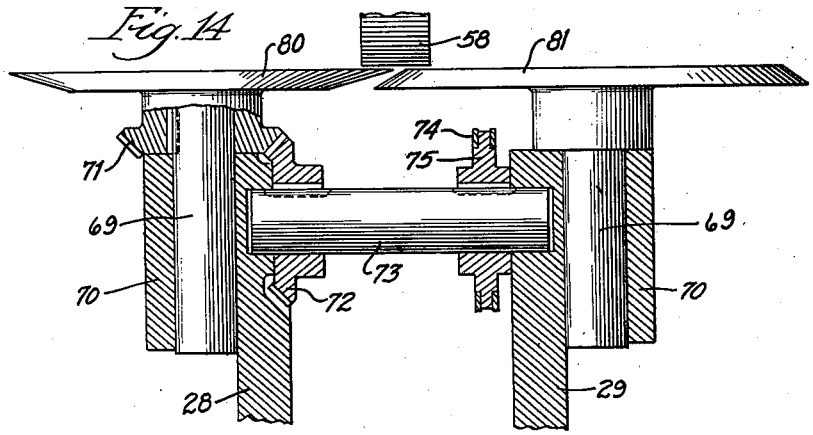
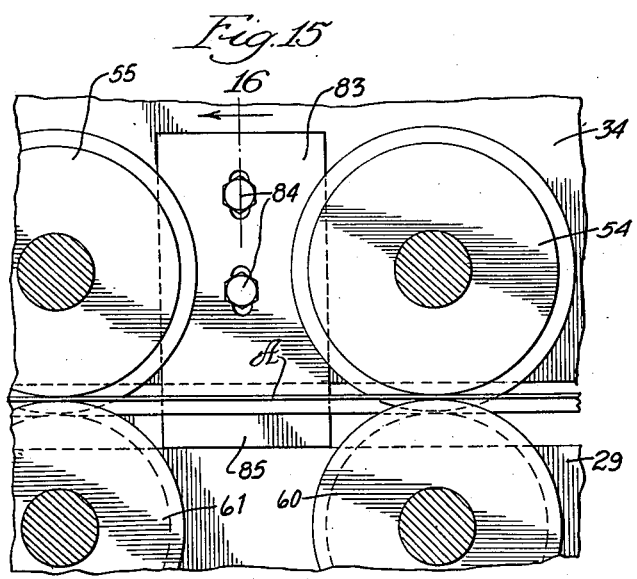
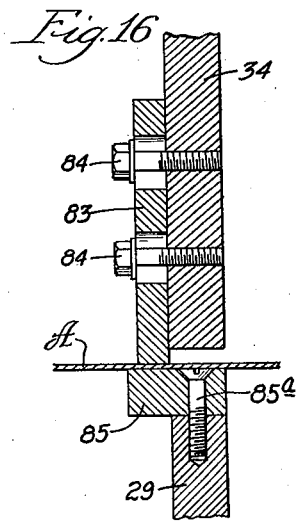
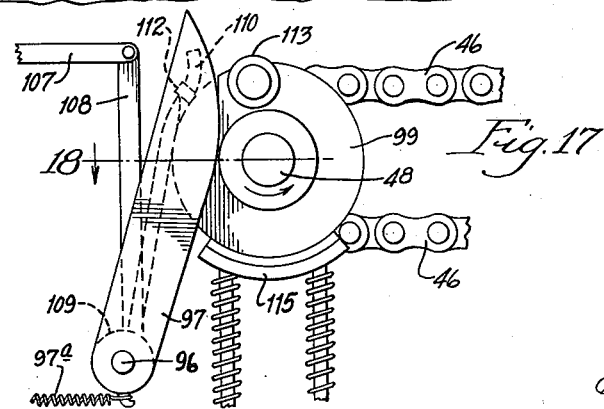
Inventor:
James J. Ingels Dec. 31, 1935. J. J. INGELS 2,025,750
METHOD OF AND APPARATUS FOR MAKING SEAMED PIPE
Original Filed Jan. 10, 1931 4 Sheets-Sheet 4
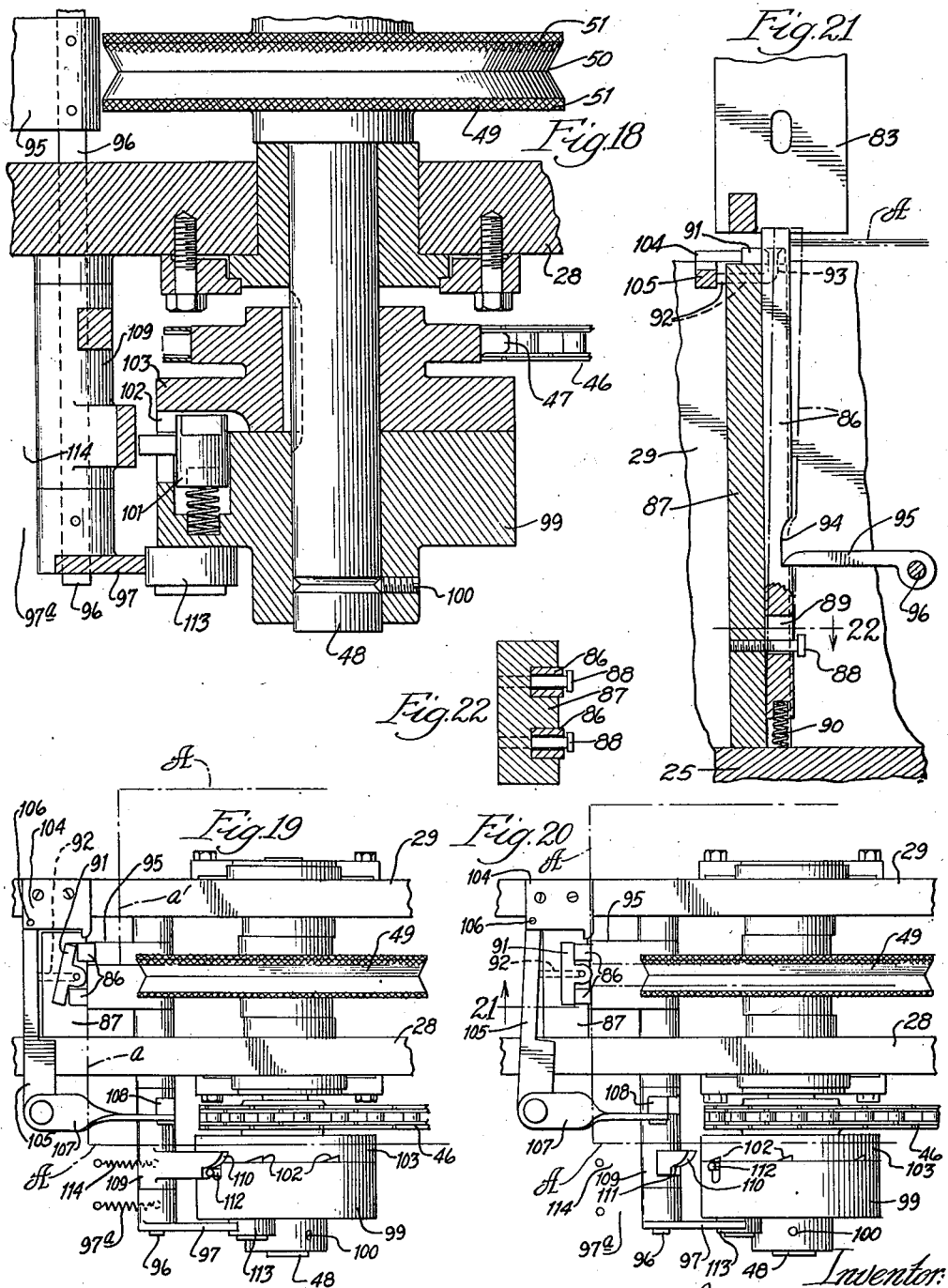

Patented Dec. 31, 1935

2,025,750

UNITED STATES PATENT OFFICE 2,025,750

METHOD OF AND APPARATUS FOR MAKING SEAMED PIPE

James J. Ingels, Chicago, Ill.

Application January 10, 1931, Serial No. 507,810
Renewed January 31, 1935

16 Claims. (Cl. 113—34)

An object of this invention is to provide an improved method of and apparatus for forming a longitudinal seam in sheet metal pipe and for closing down the seam so as to lock the same.

This and other objects, as will hereinafter appear, are accomplished by this invention which is fully described in the following specification and shown in the accompanying drawings, in which Figure 1 is a top plan view of a machine embodying the invention;

Fig. 2 is a side elevation of the same;

Fig. 3 is a partial enlarged end elevation showing the upper portion of the machine as viewed on the line 3 of Fig. 2;

Figs. 4, 5, and 6 are partial enlarged vertical sections on the lines 4, 5, and 6 of Fig. 2 showing a pipe in process of passing through the machine;

Figs. 7 to 13 inclusive are partial enlarged vertical sections showing the rollers with a pipe passing therethrough at various stages, and these sections are taken on the lines 7 to 13 respectively of Fig. 2;

Fig. 14 is a partial enlarged vertical section showing the drive for the rollers which are mounted in a vertical axis, and taken as indicated by the line 14 of Fig. 2;

Fig. 15 is a partial enlarged vertical section of the rollers as viewed on the line 15 of Fig. 1;

Fig. 16 is a partial enlarged vertical section as viewed on the line 16 of Fig. 15;

Fig. 17 is a partial enlarged side elevation of the automatic release for the pipe sections A;

Fig. 18 is an enlarged section as viewed on the line 18 of Fig. 17;

Fig. 19 is a top plan view of the automatic release with one part of the pipe in advanced position, and viewed as indicated by the line 19 of Fig. 2;

Fig. 20 is a view similar to Fig. 19 showing the parts of the release mechanism in position for releasing the pipe sections;

Fig. 21 is a partial enlarged vertical section as viewed on the line 21 of Fig. 20; and Fig. 22 is a section as viewed on the line 22 of Fig. 21.

The embodiment illustrated comprises a machine having a main frame 25 supported upon suitable legs 26, 27, and carrying two spaced lower rails 28, 29, which are separated at the right-hand end of the machine by vertical standards 30, 31, 32, to which they are secured. These standards carry separated upper rails 33, 34, forming an arm which is preferably substantially parallel to and spaced from the lower rails 28, 29 throughout their length, and being unsupported except by the three standards 30, 31, 32.

In general, the pipe A to be closed is fed through the machine from right to left, as viewed in Fig. 2, the pipe having its edges overlapped but not touching as it enters the machine from the right, the overlapping edges then being closed and interlocked by a series of rolling operations performed successively on the overlapped edges of the pipe as it passes through the machine, the pipe emerging from the machine completely seamed and locked. In order to permit the pipe to close, it is necessary that the left-hand end of the upper rails 33, 34 be entirely self-supporting, and this is accomplished by giving them a cantilever construction whereby they are supported entirely by the right-hand end of the machine on the standards 30, 31, 32.

To permit the pipe A to be overlapped and still passed through the machine, it is necessary that these standards be deeply notched. Thus, the standard 30 is provided with guide slots 30$^a$ and 30$^b$ (Fig. 3) which are adapted to receive the overlapped ends of the pipe A which, as here shown, is of rectangular form. It will be understood, however, that this pipe may be rectangular, circular, or of any other suitable shape and size which will readily pass around the upper rails 33, 34.

The standards 31, 32 are similarly provided with guide slots 31$^a$ and 31$^b$, and 32$^a$ and 32$^b$, respectively. It will be noted, however, that the guide slots of the standard 31 are closer together than those of the standard 30, and the guide slots of the standard 32 are closer together than those of the standard 31, so that as the pipe passes therethrough the overlapping edges are brought nearer together as they pass through the machine.

Power for forcing the pipe through the machine and for performing the various operations thereon is derived from a motor 35 (Fig. 2), which has a pinion 36 meshing with a large gear 37, which is carried by a shaft 38 suitably journaled in the main frame. This shaft carries a pinion 39 which meshes with a gear 40 which is carried on a shaft 41, the latter carrying also a gear 42, which meshes with a gear 43 on a shaft 44. Keyed to the opposite end of the shaft 44 is a sprocket 45 over which runs a chain 46 which also passes around a sprocket 47 on a drive shaft 48. The drive shaft 48 has keyed thereto a lower feed roller 49 having a peripheral V-shaped groove 50, the edges of which are preferably knurled as at 51. An upper feed roller 52, shaped complementary to the roller 49, is carried upon a shaft 53 which is suitably journaled in the upper rails. The upper roller 52 normally bears on the roller 49 so as to be frictionally driven thereby, and serves to grip therebetween the overlapped edges of the pipe A, as shown in Fig. 7.

A series of additional upper rollers of suitable design are carried by the upper rails, and are referred to by the numerals 54, 55, 56, 57, 58, and 59. Directly beneath the upper rollers, and supported by the lower rails, are rollers 60, 61 and 62 which are driven about horizontal axes by the shafts 63, 64 and 65. Chains 66, 67 and 68 (Fig. 1) connect the shafts to the drive shaft 48 in successive order. The lower rollers shown in Figs. 10, 11, and 12 are in pairs and rotate about vertical axes, and are journaled on shafts 69 which are secured by brackets 70 to the lower rails 28 and 29, as shown in Fig. 14. The rollers have formed integral therewith bevel gears 71 which mesh with bevel gears 72 keyed to a shaft 73 which is driven by means of chains 74 running over sprockets 75, the chains being driven from the shaft 64. Referring to Fig. 1, I have designated these horizontal rollers in their order as 76, 77, 78, 79, 80, and 81.

As the sheet metal pipe A passes through the first set of forming rollers 49, 52 of Fig. 7, the lower edge of the pipe is bent into the form of a shallow V-ridge or groove $A^1$, while the upper edge $A^2$ is bent so as to overlie the outer half of this V-ridge. As the pipe A passes on it encounters the next set of forming rolls 54, 60 of Fig. 8, which make a deeper and sharper V-ridge $A^3$. This set of forming rollers, as well as those which follow, are mounted on shafts which are journaled in the same way as the shafts 48 and 53, as shown in Fig. 2. These shafts while present are not all given reference numerals.

Emerging from the forming rollers 54, 60, the pipe A encounters the next set of rollers 55, 61 of Fig. 9, which changes the V-ridge $A^3$ of Fig. 8 to a U-ridge $A^4$ of a thinner form. As the metal pipe leaves the forming rollers 55, 61, it passes over the closing rollers 76, 77, while the U-ridge passes between them, and is closed thereby to form a seam $A^5$, as shown in Fig. 10. At the same time the pipe passes under the idler 56 which is carried on a shaft similar to the shaft 53, and the other shafts on which are carried the upper rollers of this series.

As the pipe continues to advance this seam next passes between rollers 78 and 79 which serve to give the seam $A^6$ a sharp bend about the sharp edge of the roller 78. At the same time the pipe passes under the idler 57 which is carried by a shaft 53. The pipe A passes from this set of rollers to those shown in Fig. 12, in which is shown the horizontal rollers 80 and 81 making a further bend in the seam $A^7$ about the sharp edge of the roller 80. The idler roller 58 rotates in connection with the horizontal rollers in the same manner as the rollers 56 and 57.

In Fig. 13 is shown the last set of rollers 59, 62, the latter having a flat shallow groove 82 which serves to press the seam $A^8$ tightly against the body of the pipe A, thereby completing the seam and closing it so that it is now completely locked. After this, the pipe emerges from the machine with the seam in completed form.

It will be seen that all the idler rollers, which are journaled in the upper rails, that is rollers 52 and 54 to 59, inclusive, are not positively driven, but the rollers journaled in the lower rails are positively driven by the chain 46.

Thus it will be seen that the pipe enters the machine with straight but overlapped edges, that is, as it proceeds through the machine it is first given a shallow V-shaped ridge, and this is deepened by a series of rolling operations and then closed so as to form a seam, which is then rolled over tightly against the body of the pipe. A very simple and efficient form of machine is thus provided for edging and seaming sheet metal pipe.

In practice it is found that the overlapping edges of the pipe have a tendency to run through the machine unevenly, thereby twisting the pipe. To overcome this I provide a mechanism which will now be explained. It includes a pair of plates 83 (Fig. 16) which may be adjustably mounted, as by means of cap screws 84 to the upper rails 33 and 34. Below these plates may be secured blocks 85 attached to the lower rails 28 and 29 as by screws $85^a$. The plates 83 may be adjusted to the proper position relative to the block 85 so as to permit the pipe A to pass therebetween in its forward movement, but prevent any sideslip thereof.

In forming a seam by the present device, it is necessary that the forward edges of the pipe be started through the forming rollers at the same time, otherwise the pipe, if it were square in cross section, would be somewhat spiral in shape after the seam was formed. To avoid this possibility, I have shown in detail in Figs. 17 to 22 inclusive, an equalizing device which will stop either edge which may be in advance of the other until the other has caught up, then both edges are released simultaneously to be fed through the forming rollers.

This object may be accomplished by providing two spaced bars 86 (Fig. 21) loosely mounted on a rigid block 87 by means of pins 88 fitted into slots 89 in the bars, the bars being held normally in upward or interfering position by springs 90 which rest upon the bed 25. Adjacent the upper end of the block 87 may be mounted a plate 91 which is pivotally mounted in its center to a pin 92 which is bent upward at 93, and is slidably carried by the block 87.

The bars 86 may be provided with notches 94 adapted to receive a finger 95 which is connected to the rockable shaft 96 journaled in the lower rails and extending through the rail 28 to be secured to the cam 97. It will be seen that the finger 95 and the cam 97 move together by virtue of their connection to the shaft 96, the cam being normally held in the position shown in Fig. 17 by a spring $97^a$.

The outer end of the drive shaft 48 (Fig. 18) is provided with a collar 99 rotatable thereon but secured against endwise movement by a screw 100 fitting into a groove in the shaft. The collar is provided with a spring pressed catch 101 extending parallel with the shaft 48 and adapted to engage notches 102 in the face 103 of the sprocket 47, thereby providing a turning movement at the proper time.

Attached to the lower rail 29 is a block 104 to which an arm 105 is pivoted at 106, the arm extending beyond the lower rail 28, as shown in Fig. 19. The arm lies in the same plane with the pin 92 and is adapted to be moved about the pivot 106 thereby. A link 107 connects the arm 105 to an arm 108 extending upward from a hub 109 which rocks on the shaft 96. Formed integral with the hub 109 is a cam 110 and stop 111, both being adapted to engage a pin 112 extending outwardly from the catch 101 and beyond the outer surface of the collar 99. The collar is provided with a roller 113 for actuating the cam lever 97.

Referring to Figs. 19 and 20, a pipe A starting through the machine and having one of its edges $a$ forward of the other $a'$, the edge $a$ engaging one of the bars 86 which in turn moves the plate 91 about the portion 93 of the pin 92. It will be further seen in Fig. 21 that the bar is held against the block 87 thus delaying the forward edge $a$ until the edge $a'$ is brought alongside thereof, as shown in Fig. 20.

It will be noted that the bars 86 are spaced laterally so that either edge of the pipe A can touch but one of the bars. When one of the edges is in advance of the other and is stopped against forward movement, the feed roller 49 slips momentarily against one side of the pipe while it continues to feed the other side of the pipe. When both edges are fed forward, they press against the bars 86 which are equalized by the plate 91, the plate in turn pressing the bar 92 outward against the arm 105, which releases the catch 101 through the link 107, arm 108, hub 109 and cam 110. When the catch 101 moves outward from the collar 99, it engages one of the notches 102 in the face 103 of the sprocket which is turning continuously. This engagement causes the collar to be turned by the sprocket 47, and the roller 113 attached thereto presses the cam 97 to the left, as shown in Fig. 17, which in turn moves the finger 95 in counterclockwise direction, as viewed in Fig. 21, moving the bars 86 downward against the action of the springs 90. This downward movement of the bars is sufficient to release the forward edges $a$ and $a'$ of the pipe A, and the feed rollers 49 and 52 then move the pipe forward to the next set of rollers 54 and 60.

As soon as the pipe is released by the bars 86, the cam 110 and stop 111 are brought back to normal resting position against the collar 99 by the spring 114 attached to the hub 109, as shown in Fig. 19, so that when the pin 112 completes its revolution, it will ride against the cam surface 110 and disengage the catch 101 from the notches 102. I provide a spring pressed brake shoe 115 to bear against the collar 99 to prevent any tendency of the collar to move out of its resting position, as shown in Fig. 17. It will be noted that the collar 99 makes but one revolution for each pipe A that is placed in the machine, that being at the time the pipe is released by the bars 86. During the remaining time the collar is idle on the drive shaft 48.

The advantage of having an equalizing device, as described, is readily apparent, particularly in the case where the pipe is of great length and is unwieldy to handle. Further, it may be necessary, in the case of very large pipes, to make them of longitudinal sections, in which case the separate sections need not be placed in the machine simultaneously, but may be inserted one at a time, and the first will not be fed forward until the second has been fed forward even with it, when the two will proceed together.

While I have shown and described but a single embodiment of my invention, it is to be understood that it is capable of many modifications. Changes, therefore, in the construction and arrangement may be made which do not depart from the spirit and scope of the invention as disclosed in the appended claims.

I claim:
1. The method of forming a longitudinal seam in a sheet metal pipe comprising overlapping the edges of the pipe, forming a shallow longitudinal V-ridge in one edge, bending the other edge to overlie one side of the V-ridge, deepening the V-ridge, closing the V-ridge and folding it over to form a seam, all while the pipe is fed longitudinally.

2. The method of forming a longitudinal seam in a sheet metal pipe comprising overlapping the edges of the pipe, forming a shallow longitudinal V-ridge in one edge, simultaneously bending the other edge to overlie one side of the V-ridge, deepening the V-ridge, closing the V-ridge and folding it over to form a seam, all while the pipe is fed longitudinally.

3. The method of forming a longitudinal seam in a sheet metal pipe comprising overlapping the edges of the pipe, rolling a shallow longitudinal V-ridge in one edge, simultaneously rolling the other edge to overlie one side of the V-ridge, deepening the V-ridge, closing the V-ridge and folding it over to form a seam, all while the pipe is fed longitudinally.

4. The method of forming a longitudinal seam in a sheet metal pipe comprising overlapping the edges of the pipe, forming a shallow longitudinal V-ridge in one edge, bending the other edge to overlie one side of the V-ridge, deepening the V-ridge, closing the V-ridge and folding it over to form a seam, said operations being performed by rolling, all while the pipe is fed longitudinally.

5. A machine for forming a longitudinal seam in the overlapping edges of a sheet metal pipe comprising a frame, an arm parallel to the frame and about which the pipe being formed passes longitudinally, supports connecting the frame and arm at the entering end of the machine, said supports having slots permitting the overlapped edges of the pipe to pass, means for forming a seam on the overlapping edges, means for closing the seam, and means for propelling the pipe longitudinally of the arm.

6. A machine for forming a longitudinal seam in the overlapping edges of a sheet metal pipe comprising a frame, an arm parallel to the frame and about which the pipe being formed passes longitudinally, supports connecting the frame and arm at the entering end of the machine, said supports having slots permitting the overlapped edges of the pipe to pass, rollers for forming a seam on the overlapping edges, means for closing the seam, and means for propelling the pipe longitudinally of the arm.

7. A machine for forming a longitudinal seam in the overlapping edges of a sheet metal pipe comprising a frame, an arm parallel to the frame and about which the pipe being formed passes longitudinally, supports connecting the frame and arm at the entering end of the machine, said supports having slots permitting the overlapped edges of the pipe to pass, feed rollers for feeding the pipe through the machine, rollers for forming a seam on the overlapping edges, and means for closing the seam.

8. A machine for forming a longitudinal seam in the overlapping edges of two adjacent edges of sheet metal comprising a frame, an arm parallel to the frame and about which the pipe being formed passes longitudinally, supports connecting the frame and arm at the entering end of the machine, said supports having slots permitting the overlapped edges of the pipe to pass, feed rollers for feeding the sheet metal through the machine, rollers for forming a seam on the overlapping edges, means for closing the seam, and means for preventing one forward end of an overlapping edge moving forward in advance of the other.

9. A machine for forming a longitudinal seam in the overlapping edges of a sheet metal pipe comprising a frame, an arm parallel to the frame and about which the pipe being formed passes longitudinally, supports connecting the frame and arm at the entering end of the machine, said supports having slots permitting the overlapped edges of the pipe to pass, feed rollers for feeding the pipe through the machine, rollers for forming a seam on the overlapping edges, and rollers for closing the seam, said rollers being driven from a common source of power.

10. A machine for forming a longitudinal seam in the overlapping edges of a sheet metal pipe comprising a frame, an arm parallel to the frame and about which the pipe being formed passes longitudinally, supports connecting the frame and arm at the entering end of the machine, said supports having slots permitting the overlapped edges of the pipe to pass, feed rollers for feeding the pipe through the machine, rollers for forming a seam on the overlapping edges, and means for closing the same including rollers having axes at right angles to the axes of the seam forming rollers.

11. A machine for forming a longitudinal seam in the overlapping edges of a sheet metal pipe comprising a frame, an arm parallel to the frame and about which the pipe being formed passes longitudinally, supports connecting the frame and arm at the entering end of the machine, said supports having slots permitting the overlapped edges of the pipe to pass, feed rollers for feeding the pipe through the machine, rollers for forming a seam on the overlapping edges, and means for closing the same, including seam closing rollers having axes at right angles to the axes of the seam forming rollers.

12. A machine for forming a longitudinal seam in the overlapping edges of a sheet metal pipe comprising a frame, an arm parallel to the frame and about which the pipe being formed passes longitudinally, supports connecting the frame and arm at the entering end of the machine, said supports having slots permitting the overlapped edges of the pipe to pass, feed rollers having engaging surfaces located between the arm and frame for feeding the pipe through the machine, rollers for forming a seam on the overlapping edges, means for closing the seam, the forming rollers being carried by the arm and by the frame, certain of the rollers on the frame being geared together.

13. A machine for forming a longitudinal seam in the overlapping edges of a sheet metal pipe comprising a frame and about which the pipe being formed passes longitudinally, an arm parallel to the frame, supports connecting the frame and arm at the entering end of the machine, said supports having slots permitting the overlapped edges of the pipe to pass, feed rollers having engaging surfaces located between the arm and frame for feeding the pipe through the machine, rollers for forming a seam on the overlapping edges, means for closing the seam, the forming rollers being carried by the arm and by the frame, certain of the rollers on the frame being geared together, means for preventing said pipe entering said feed rollers until the two edges are substantially even, said means including two fingers each of which engages one of said edges.

14. A machine for forming a longitudinal seam in the overlapping edges of a sheet metal pipe comprising a frame and about which the pipe being formed passes longitudinally, an arm parallel to the frame, supports connecting the frame and arm at the entering end of the machine, said supports having slots permitting the overlapped edges of the pipe to pass, feed rollers having engaging surfaces located between the arm and frame for feeding the pipe through the machine, rollers for forming a seam on the overlapping edges, means for closing the seam, the forming rollers being carried by the arm and by the frame, certain of the rollers on the frame being geared together, means for preventing said pipe entering said feed rollers until the two edges are substantially even, said means including two fingers each of which engages one of said edges, said fingers moving out of the path of said pipe as the two edges advance substantially evenly.

15. The method of uniting two sheets of metal comprising overlapping the meeting edges of the sheets, forming a shallow longitudinal V-ridge in one edge, simultaneously bending the other edge to overlie one side of the V-ridge, deepening the V-ridge, closing the V-ridge and folding it over to form a seam, all while the sheets progress longitudinally.

16. The method of uniting two sheets of metal comprising overlapping the meeting edges of the sheets, forming a shallow longitudinal V-ridge in one edge, bending the other edge to overlie one side of the V-ridge, deepening the V-ridge, closing the V-ridge and folding it over to form a seam, said operations being performed by rolling; all while the sheets progress longitudinally.

JAMES J. INGELS.